United States Patent
Hashimoto

(10) Patent No.: US 7,440,059 B2
(45) Date of Patent: Oct. 21, 2008

(54) REFLECTION TYPE LIQUID CRYSTAL DISPLAY ELEMENT AND LIQUID CRYSTAL DISPLAY UNIT

(75) Inventor: Shunichi Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 815 days.

(21) Appl. No.: 10/513,132

(22) PCT Filed: Mar. 5, 2004

(86) PCT No.: PCT/JP2004/002897

§ 371 (c)(1),
(2), (4) Date: Nov. 1, 2004

(87) PCT Pub. No.: WO2004/079438

PCT Pub. Date: Sep. 16, 2004

(65) Prior Publication Data

US 2005/0157227 A1    Jul. 21, 2005

(30) Foreign Application Priority Data

Mar. 7, 2003    (JP) .............................. 2003-061110

(51) Int. Cl.
*G02F 1/1335* (2006.01)
(52) U.S. Cl. ....................... 349/129; 349/113
(58) Field of Classification Search ................. 349/129, 349/113
See application file for complete search history.

(56) References Cited

U.S. PATENT DOCUMENTS

| 5,477,359 | A | 12/1995 | Okazaki |
| 6,287,649 | B1 * | 9/2001 | Fukushima et al. .......... 428/1.2 |
| 2001/0028412 | A1 * | 10/2001 | Ito ................................. 349/5 |
| 2003/0133055 | A1 * | 7/2003 | Um et al. ...................... 349/43 |

(Continued)

FOREIGN PATENT DOCUMENTS

JP    05-173170    7/1993

(Continued)

OTHER PUBLICATIONS

European Search Report dated Sep. 7, 2007.

*Primary Examiner*—David C. Nelms
*Assistant Examiner*—Phu Vu
(74) *Attorney, Agent, or Firm*—Sonnenschein Nath & Rosenthal LLP

(57) ABSTRACT

Provided are a reflective liquid crystal display device and a liquid crystal display unit capable of eliminating or minimizing the occurrence of misalignment specific to a vertically aligned liquid crystal due to the structure of a pixel groove and achieving higher contrast and superior image quality. In a reflective pixel electrode (42), a peripheral portion is inclined, and the reflective pixel electrode has a trapezoidal shape so that the width of the reflective pixel electrode (42) increases from the top side to the bottom side. When a side surface of the reflective pixel electrode (42) is inclined so as to eliminate verticality in a cross section of the reflective pixel electrode (42), liquid crystal molecules aligned in a horizontal direction to an extreme in a pixel groove portion can be eliminated. Even if liquid crystal molecules are locally and slightly aligned in a horizontal direction, sufficient verticality can be maintained in the pixel groove portion by an interaction with vertically aligned liquid crystal molecules around the horizontally aligned liquid crystal molecules.

10 Claims, 8 Drawing Sheets

U.S. PATENT DOCUMENTS

2003/0151711 A1 * 8/2003 Yuh et al. .................. 349/129

FOREIGN PATENT DOCUMENTS

| JP | 11-242226 | 9/1999 |
|---|---|---|
| JP | 2001-083504 | 3/2001 |
| JP | 2002-268067 | 9/2002 |
| JP | 2002-287158 | 10/2002 |
| JP | 2003-057674 | 2/2003 |

* cited by examiner

| | TEST SAMPLE No. | PIXEL PITCH W2 (μm) | WIDTH OF PIXEL GROOVE W1 (μm) | THICKNESS OF PASSIVATION FILM (μm) | MISALIGNMENT STATE |
|---|---|---|---|---|---|
| COMPARATIVE EXAMPLE | 1 | 9 | 0.8 | — | NOT OCCURRED |
| COMPARATIVE EXAMPLE | 2 | 9 | 0.7 | — | SLIGHTLY OCCURRED |
| COMPARATIVE EXAMPLE | 3 | 9 | 0.6 | — | OCCURRED |
| COMPARATIVE EXAMPLE | 4 | 9 | 0.5 | — | OCCURRED |
| COMPARATIVE EXAMPLE | 5 | 9 | 0.4 | — | OCCURRED |
| COMPARATIVE EXAMPLE | 6 | 9 | 0.8 | 0.045 | SLIGHTLY OCCURRED |
| COMPARATIVE EXAMPLE | 7 | 9 | 0.7 | 0.045 | OCCURRED |
| COMPARATIVE EXAMPLE | 8 | 9 | 0.6 | 0.045 | OCCURRED |
| COMPARATIVE EXAMPLE | 9 | 9 | 0.5 | 0.045 | OCCURRED |
| COMPARATIVE EXAMPLE | 10 | 9 | 0.4 | 0.045 | OCCURRED |
| EXAMPLE 1 | 11 | 9 | 0.8 | — | NOT OCCURRED |
| EXAMPLE 1 | 12 | 9 | 0.7 | — | NOT OCCURRED |
| EXAMPLE 1 | 13 | 9 | 0.6 | — | NOT OCCURRED |
| EXAMPLE 1 | 14 | 9 | 0.5 | — | NOT OCCURRED |
| EXAMPLE 1 | 15 | 9 | 0.4 | — | NOT OCCURRED |
| EXAMPLE 1 | 16 | 9 | 0.8 | 0.045 | NOT OCCURRED |
| EXAMPLE 1 | 17 | 9 | 0.7 | 0.045 | NOT OCCURRED |
| EXAMPLE 1 | 18 | 9 | 0.6 | 0.045 | NOT OCCURRED |
| EXAMPLE 1 | 19 | 9 | 0.5 | 0.045 | NOT OCCURRED |
| EXAMPLE 1 | 20 | 9 | 0.4 | 0.045 | NOT OCCURRED |
| EXAMPLE 2 | 21 | 9 | 0.8 | — | NOT OCCURRED |
| EXAMPLE 2 | 22 | 9 | 0.7 | — | NOT OCCURRED |
| EXAMPLE 2 | 23 | 9 | 0.6 | — | NOT OCCURRED |
| EXAMPLE 2 | 24 | 9 | 0.5 | — | NOT OCCURRED |
| EXAMPLE 2 | 25 | 9 | 0.4 | — | NOT OCCURRED |

FIG. 8

REFLECTION TYPE LIQUID CRYSTAL DISPLAY ELEMENT AND LIQUID CRYSTAL DISPLAY UNIT

The present invention relates to a reflective liquid crystal display device comprising a reflective pixel electrode, and a liquid crystal display unit such as a reflective liquid crystal projector which displays an image through the use of the reflective liquid crystal display device.

In recent years, with improvement in definition, miniaturization and brightness of projection displays, as display devices of the projection displays, reflective devices capable of reducing their size and displaying with high definition, and being expected to have high light utilization efficiency have become a focus of attention and have been put to practical use. A well-known reflective device is an active type reflective liquid crystal device in which a liquid crystal is injected between a pair of substrates facing each other. In this case, as the pair of substrates, a facing substrate formed through laminating a transparent electrode on a glass substrate, and a drive substrate using a silicon (Si) substrate which includes, for example, a CMOS (Complementary-Metal Oxide Semiconductor) type semiconductor circuit are used. On the drive substrate, a reflective pixel electrode of metal for reflecting light and applying a voltage to the liquid crystal is disposed so as to form a pixel electrode substrate. The reflective pixel electrode is made of a metal material including aluminum as a main component, which is generally used in a LSI (Large Scale Integrated circuit) process.

In such a reflective liquid crystal display device, when a voltage is applied to the transparent electrode disposed on the facing substrate and the reflective pixel electrode disposed on the drive substrate, a voltage is applied to the liquid crystal. At this time, a change in optical properties of the liquid crystal occurs depending upon a potential difference between these electrodes, thereby the liquid crystal modulates incident light. The reflective liquid crystal display device can display a gray-scale image by the modulation of the light.

In such a reflective liquid crystal display device, specifically an active type reflective liquid crystal display device into which a vertically aligned liquid crystal is injected has become a focus of attention as a projection device in recent years, because the active type reflective liquid crystal display device has high contrast and high response speed. Herein, "a vertically aligned liquid crystal material" means a liquid crystal material with negative dielectric anisotropy (a difference $\Delta\in (=\in(\|)-\in(\perp))$ between a dielectric constant $\in(\|)$ parallel to a long axis of liquid crystal molecules and a dielectric constant $\in(\perp)$ perpendicular to the long axis of the liquid crystal molecules is negative), and in the vertically aligned liquid crystal material, when an applied voltage is zero, the liquid crystal molecules are aligned in a substantially vertical direction with respect to a substrate surface, thereby the active type reflective liquid crystal display device operates in a normally black mode.

A conventional example of such an active type reflective liquid crystal display device into which a vertically aligned liquid crystal is injected is proposed in, for example, Japanese Unexamined Patent Application Publication No. 2003-57674.

However, in general, it is difficult to control the alignment of the vertically aligned liquid crystal material. In the case where there is an uneven structure on the drive substrate by the reflective pixel electrode, an alignment defect occurs around the pixel electrode due to the uneven structure. The alignment defect causes a decline in uniformity of characteristics in a display surface, an increase in black level (a phenomenon in which a black portion of an image does not appear black but gray), degradation in image quality due to disclination. In particular, in a reflective liquid crystal display device using a silicon drive device, a pixel pitch is as small as 10 microns or less in general, so compared to a large direct-view-type liquid crystal device with a pixel pitch of a few tens of microns or more, a defective region around a pixel easily exerts an influence upon image quality, and unlike a transmissive liquid crystal display device, the defective region cannot be covered with a black matrix, so a basic practical requirement for the reflective liquid crystal display device is that a misalignment region must be minimized or completely eliminated.

The above alignment defect will be described in more detail below referring to drawings. At first, referring to FIGS. 9A and 9B, the structure of a pixel electrode in a conventional reflective liquid crystal display device will be described below. As shown in the drawings, reflective pixel electrodes 111 are arranged on a silicon drive substrate 110 in a matrix. After, for example, an aluminum film is formed on the silicon drive substrate 110 in a semiconductor process, the aluminum film is processed by a photolithography technique to form the reflective pixel electrodes 111 in a square shape. In this case, pixels are driven electrically independently, so each reflective pixel electrode 111 is cut in a pixel surface in order to completely prevent an electrical short circuit. Therefore, side surfaces of each reflective pixel electrode 111 are generally vertical in a thickness direction as shown in FIG. 9B.

Although a width between adjacent reflective pixel electrodes 111, that is, a width W1 between pixels (a width W1 of a pixel groove) depends upon the resolution of lithography and design rules, the width W1 is approximately 0.4 to 1 microns in general. However, according to an improvement in manufacturing techniques, there is a sufficient possibility of reducing the width W1 to 0.3 microns. Therefore, when a pixel pitch W2 is 10 microns, a 9.7- to 9.0-micron square electrode as the reflective pixel electrode 111 is surrounded with a groove with a width of 0.3 to 1 microns. The larger the display pixel area occupancy (aperture ratio) is, the more the reflectivity increases, so when the width W1 of the pixel groove is as narrow as possible, superior reflectivity can be obtained.

FIGS. 10A and 10B schematically show a state where a vertically aligned liquid crystal material on the pixel structure shown in FIGS. 9A and 9B is aligned. The alignment film 112 is laminated on the whole pixel plane (including surfaces of the reflective pixel electrode 111 and the pixel groove), and liquid crystal molecules are almost vertically aligned by the alignment film as a base so that the long axis of liquid crystal molecules is aligned in a pretilt angle direction. On the other hand, it has been observed from measurements that the alignment film 112 is formed on the side surfaces of the reflective pixel electrode 111, so the liquid crystal molecules in the side surfaces of the pixel groove tend to be vertically aligned from the alignment film 112, thereby the liquid crystal molecules around the pixel groove tend to be horizontally aligned. When the pixel groove is as wide as, for example, 1 micron (refer to FIG. 10A), the ratio of an area affected by a force for vertically aligning liquid crystal molecules by the alignment film formed on the bottom of the pixel groove is so large that the force becomes dominant, so an influence by the side surfaces of the pixel is reduced, thereby most of the liquid crystal molecules are substantially vertically aligned. As a result, no defect around the pixel occurs. However, as shown in FIG. 10B, when the pixel groove width W1 is 0.7 microns or less, the influence by the side surfaces of the pixel is large, thereby as a result, it has been observed that a large amount of liquid crystal molecules are horizontally aligned in the pixel groove.

The horizontally aligned liquid crystal molecules in the pixel groove affect an area around the pixel, so as a result, liquid crystal molecules on the surface of the pixel is vertically aligned, but liquid crystal molecules from the area around the pixel to the pixel groove are horizontally aligned, that is, liquid crystal molecules are nonuniformly aligned. A phenomenon in which misalignment extends to an edge portion of the pixel (a region 120 in FIG. 10B) occurs, and the phenomenon specifically causes degradation in image quality. In the results of measurements, the narrower the width W1 of the pixel groove is, or the deeper the depth of a groove portion is, the more this tendency increases. In such a state, uniform alignment cannot be obtained in the whole display area, thereby resulting in degradation in various characteristics. When the width W1 of the pixel groove is large enough, no problem occurs; however, the reflectivity declines due to a decline in the aperture ratio, so it is impractical. The above phenomenon is a problem specific to the vertically aligned liquid crystal material.

Experience has shown that the above phenomenon easily occurs specifically in the case where an obliquely evaporated film of an inorganic material such as silicon oxide is used as the alignment film 112, and the thinner the thickness of a liquid crystal layer is, the more easily the phenomenon occurs. In order to prevent the phenomenon, it is considered to increase the pretilt angle; however, in general, it is difficult to stably form a large pretilt angle, so the pretilt angle has a limit, and there is a problem that the black level increases and the contrast declines according to an increase in the pretilt angle. Therefore, a technique of preventing misalignment in an area around the pixel in a state where the pretilt angle is kept within an adequate range and good contrast is maintained.

SUMMARY OF THE INVENTION

In view of the foregoing, it is an object of the invention to provide a reflective liquid crystal display device and a liquid crystal display unit which are capable of eliminating or minimizing misalignment specific to a vertically aligned liquid crystal which occurs due to the structure of a pixel groove so as to achieve high contrast and superior image quality.

A reflective liquid crystal display device according to the invention comprises: a pixel electrode substrate including a plurality of reflective pixel electrodes; a facing substrate including a transparent electrode, the transparent electrode facing the reflective pixel electrodes; and a vertically aligned liquid crystal injected between the pixel electrode substrate and the facing substrate, wherein at least one side surface of each of the reflective pixel electrodes is inclined.

More specifically, a side surface of each of the reflective pixel electrodes is inclined in a cross section of the reflective pixel electrode in a thickness direction so that the width of the reflective pixel electrode increases from the top side to the bottom side, and the reflective pixel electrode has a trapezoidal shape in the cross section.

A liquid crystal display unit according to the invention displays an image by using light modulated by the reflective liquid crystal display device according to the invention.

In the reflective liquid crystal display device and the liquid crystal display unit according to the invention, the side surface of the pixel electrode is inclined, so compared to a conventional pixel electrode in which a side surface is vertical in a cross section, liquid crystal molecules aligned in a horizontal direction to an extreme in a pixel groove portion can be eliminated. Even if liquid crystal molecules are locally and slightly aligned in a horizontal direction, sufficient verticality can be maintained in the pixel groove portion by an interaction with vertically aligned liquid crystal molecules around the horizontally aligned liquid crystal molecules. As a result, even if the width of the pixel groove is small, or the liquid crystal layer is thin, a state where all liquid crystal molecules are substantially vertically aligned can be achieved. Thereby, the occurrence of misalignment specific to a vertically aligned liquid crystal due to the structure of the pixel groove can be eliminated or minimized, and high contrast and superior image quality can be achieved.

BRIEF DESCRIPTION OF THE DRAWINGS

FIG. 3A is a plan view, and FIG. 3B is a sectional view;

FIG. 8 is a table showing results of observing the occurrence of misalignment in the reflective liquid crystal display device according to the embodiment of the invention and a conventional reflective liquid crystal display device;

FIG. 9A is a plan view, and FIG. 9B is a sectional view.

DETAILED DESCRIPTION OF THE PRESENTLY PREFERRED EMBODIMENTS.

A preferred embodiment of the present invention will be described in more detail below referring to the accompanying drawings.

<Structure of Reflective Liquid Crystal Display Device>

Figure 1:
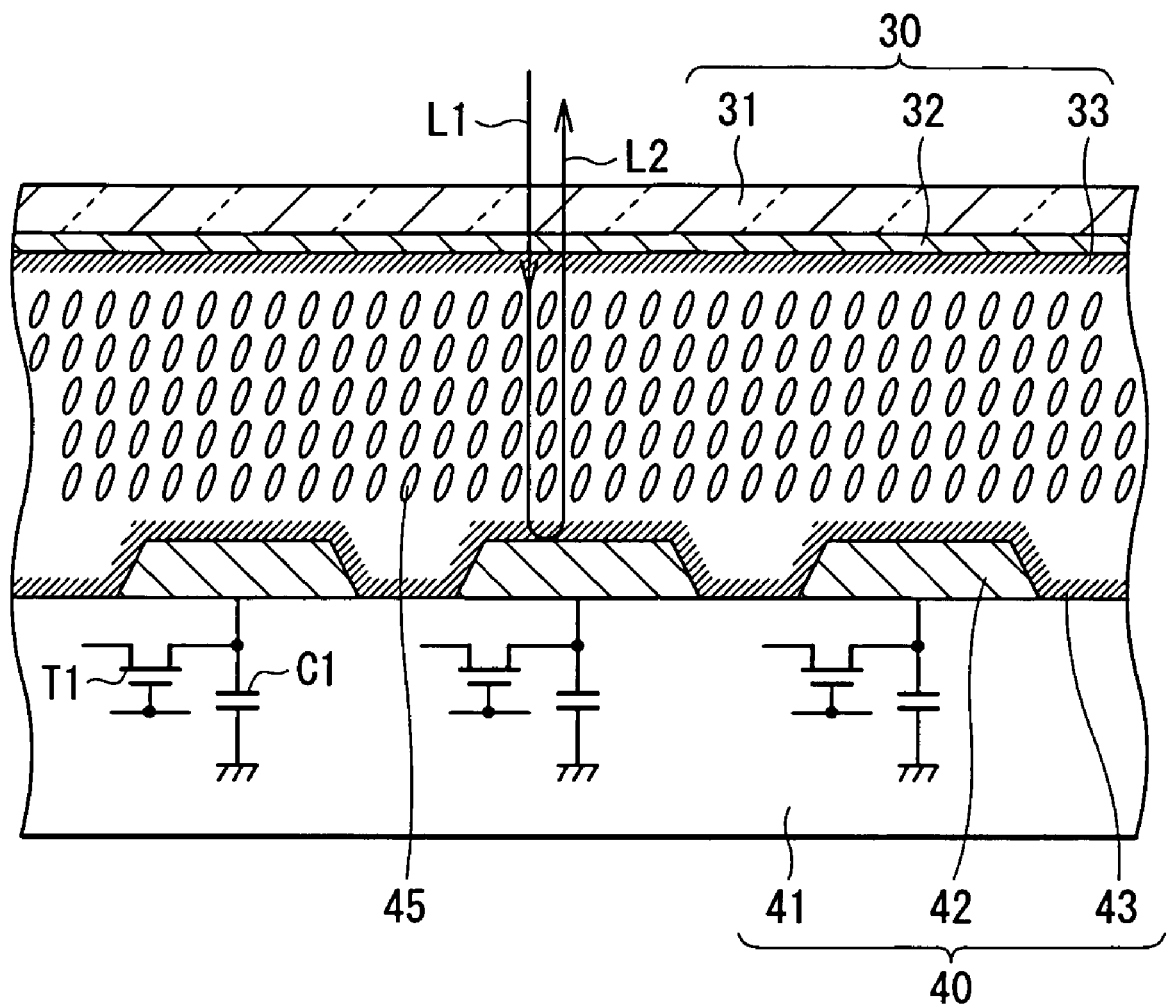
FIG. 1 is a sectional view of a reflective liquid crystal display device according to an embodiment of the invention.

FIG. 1 shows the whole structure of a reflective liquid crystal display device according to an embodiment of the invention. The reflective liquid crystal display device comprises a facing substrate 30 and a pixel electrode substrate 40 which face each other, and a vertically aligned liquid crystal 45 injected between these substrates 30 and 40.

The facing substrate 30 includes a glass substrate 31, and a transparent electrode 32 laminated on the glass substrate 31. An alignment film 33 is laminated on the whole surface of the transparent electrode 32 on a side closer to the vertically aligned liquid crystal 45. As the transparent electrode 32, an electrode material with a function of transmitting light, generally ITO (Indium Tin Oxide) which is a solid solution material of tin oxide ($SnO_2$) and indium oxide ($In_2O_3$) is used. A common potential (for example, a ground potential) is applied to the transparent electrode 32 in the whole pixel region.

The pixel electrode substrate 40 is formed, for example, through forming reflective pixel electrodes 42 on a single-crystal silicon substrate 41 in a matrix. In the silicon substrate 41, an active drive circuit including a transistor T1 such as CMOS or NMOS and a capacitor (auxiliary capacitor) C1 is formed. An alignment film 43 is laminated on the whole surface of the pixel electrode substrate 40 on a side closer to the vertically aligned liquid crystal 45.

Each of the reflective pixel electrodes 42 is made of a metal film typified by aluminum (Al) or silver (Ag). In the case where an aluminum electrode or the like is used as the reflective pixel electrode 42, the reflective pixel electrode 42 has a function as a light reflective film and a function as an electrode which applies an voltage to a liquid crystal, and in order to further increase reflectivity, a reflective layer of a multi-layer film such as a dielectric mirror may be formed on the aluminum electrode. A characteristic part of the embodiment is the shape of the reflective pixel electrode 42, which will be described later.

In the vertically aligned liquid crystal 45 used in the reflective liquid crystal display device, when an applied voltage is zero, the long axis of the molecules of the vertically aligned liquid crystal 45 is aligned in a substantially vertical direction with respect to each substrate surface, and when a voltage is applied, the long axis is inclined in a in-plane direction, thereby the transmittance of the vertically aligned liquid crystal 45 changes. If the directions where the liquid crystal molecules are inclined are not uniform during drive, the contrast becomes uneven. In order to prevent uneven contrast, it is required to align liquid crystal molecules at a very small pretilt angle in a predetermined direction (in a diagonal direction of a device, in general) in advance, then vertically align them. When the pretilt angle is too large, vertical alignment is degraded, thereby a black level is increased, and the contrast declines. Therefore, in general, the pretilt angle is controlled within a range from approximately 1° to 7°.

As the alignment films 33 and 43, for example, obliquely evaporated films of silicon oxide typified by silicon dioxide ($SiO_2$) are used. In this case, when an evaporation angle during oblique evaporation is changed, the pretilt angle of the above vertically aligned liquid crystal 45 is controlled. Moreover, as the alignment films 33 and 43, films formed through rubbing (aligning), for example, a polyimide-based organic compound can be used. In this case, when rubbing conditions are changed, the pretilt angle can be controlled.

Figure 2:
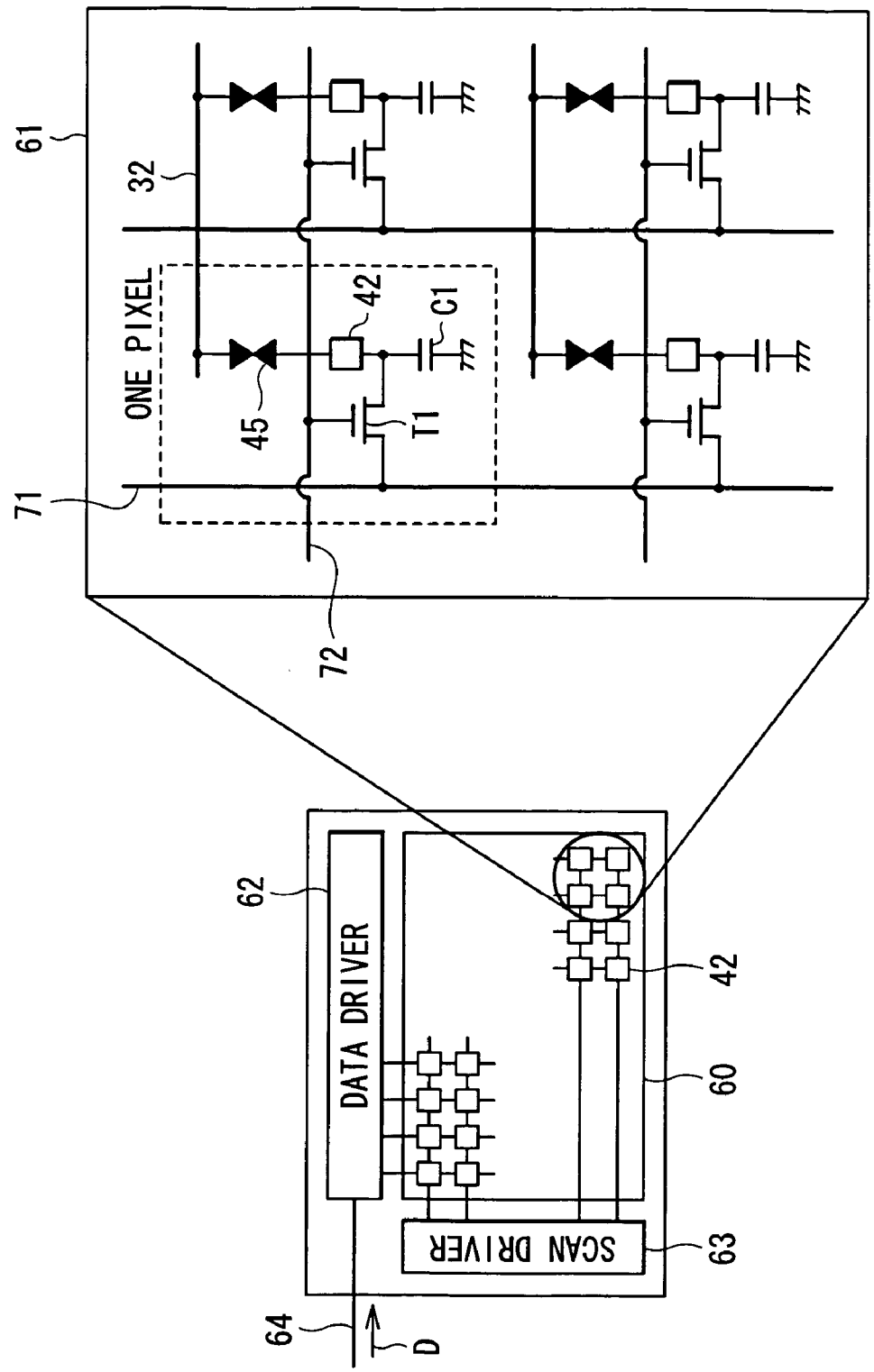
FIG. 2 is an illustration for describing the structure of a drive circuit of the reflective liquid crystal display device according to the embodiment.

FIG. 2 shows the structure of a drive portion of the reflective liquid crystal display device. The drive portion includes a pixel drive circuit 61 formed in each pixel and a logic portion such as a data driver 62 and a scan driver 63 which is disposed around a display region 60. Image signals D from outside are inputted into the data driver 62 through a signal line 64. The pixel drive circuit 61 is formed under each reflective pixel electrode 42, and includes a switching transistor T1 and the auxiliary capacitor C1 which supplies a voltage to the liquid crystal. The transistor T1 is required to have a withstand voltage corresponding to a drive voltage of the vertically aligned liquid crystal 45, so in general, the transistor T1 is formed by a higher withstand voltage process than the logic portion.

In the pixel drive circuit 61, a plurality of data lines 71 are arranged in a column direction and a plurality of scanning lines 72 are arranged in a line direction. An intersection of each data line 71 and each scanning line 72 corresponds to one pixel. A source electrode of each transistor T1 is connected to the data line 71, and a gate electrode of the transistor T1 is connected to the scanning line 72. A drain electrode of each transistor T1 is connected to each reflective pixel electrode 42 and the auxiliary capacitor C1. Each data line 71 is connected to the data driver 62, and image signals are supplied from the data driver 62. Each scanning line 72 is connected to the scan driver 63, and scanning signals are successively supplied from the scan driver 63.

Figure 3:
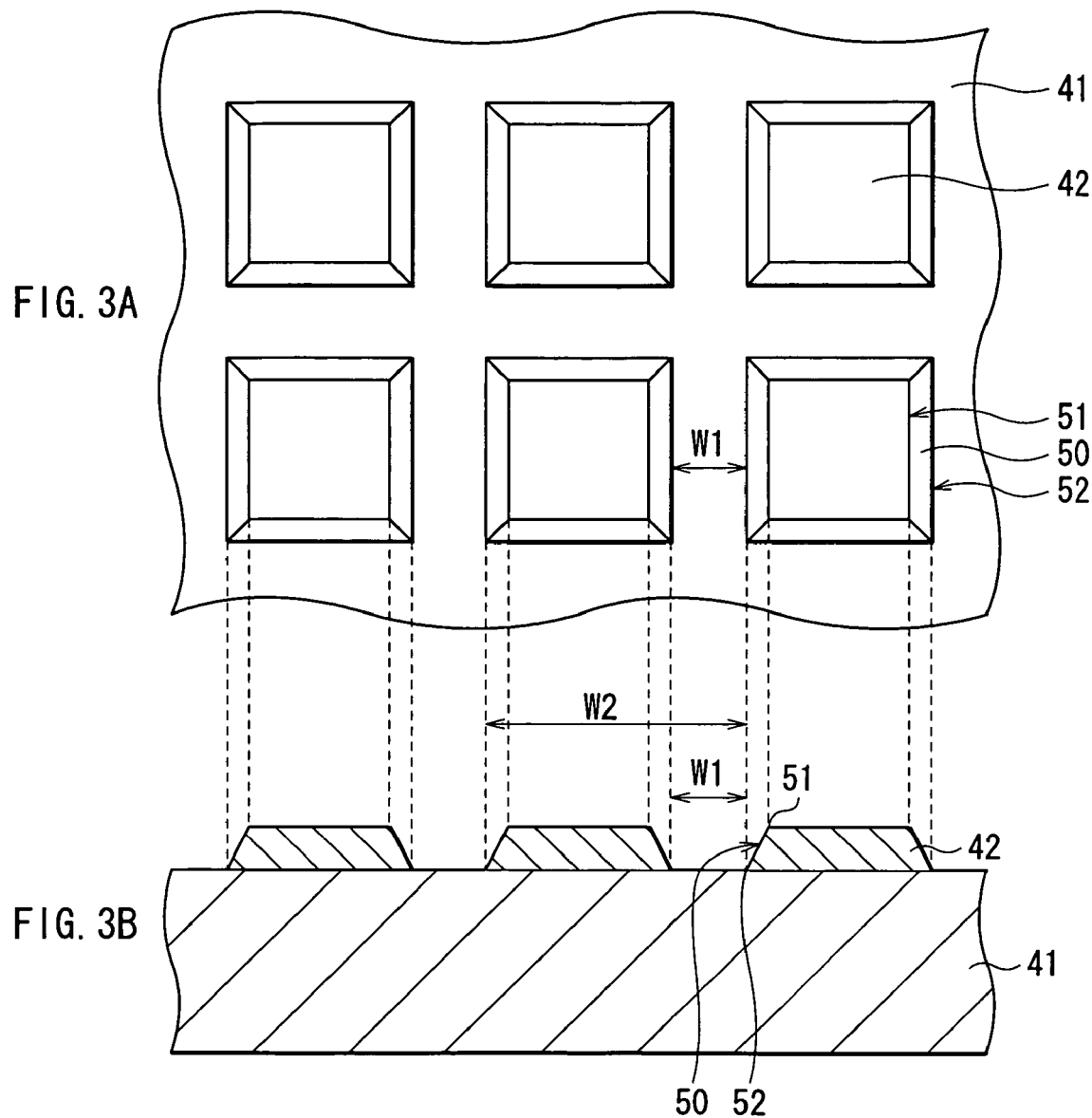
FIGS. 3A and 3B are illustrations of a pixel electrode in the reflective liquid crystal display device according to the embodiment of the invention.

Next, the structure of the reflective pixel electrode 42 which is a characteristic part of the embodiment will be described in detail below. As shown in FIGS. 3A and 3B, in the reflective pixel electrode 42, a peripheral portion is inclined. In other words, a side surface 50 is inclined in a cross section of the reflective pixel electrode 42 in a thickness direction (refer to FIG. 3B). Thereby, the reflective pixel electrode 42 has a trapezoidal shape in which the width of the electrode 42 increases from the top side (a liquid crystal side) to the bottom side (a substrate side). The alignment film 43 is laminated along the shape of the reflective pixel electrode 42, so the whole reflective pixel electrode 42 including the alignment film 43 has a trapezoidal shape. In the reflective pixel electrode 42, not only the top surface but also the inclined side surface 50 functions as a pixel electrode. In other words, the side surface 50 also has a function of reflecting light and a function of applying a voltage to the vertically aligned liquid crystal 45.

The thickness A of the reflective pixel electrode 42 is preferably at least 50 nm or more in terms of film formation, and more preferably 120 nm or more so as to obtain superior reflectivity. In general, the thickness A is approximately 150 nm. Moreover, although the width between adjacent reflective pixel electrodes 42, that is, the width W1 between pixels (the width W1 of the pixel groove) depends upon the resolution of lithography and design rules, the width W1 is approximately 0.4 to 1 microns in general. However, according to an improvement in manufacturing techniques, there is a sufficient possibility of reducing the width W1 to 0.3 microns. Therefore, when a pixel pitch W2 is 10 microns, in a plan view, a 9.7- to 9.0-micron square electrode as the reflective pixel electrode 42 is surrounded with a groove with a width of 0.3 to 1 microns. In terms of reflectivity, the larger the display pixel area occupancy (aperture ratio) is, the more the reflectivity increases, so when the width W1 of the pixel groove is as narrow as possible, superior reflectivity can be obtained.

Figure 5:
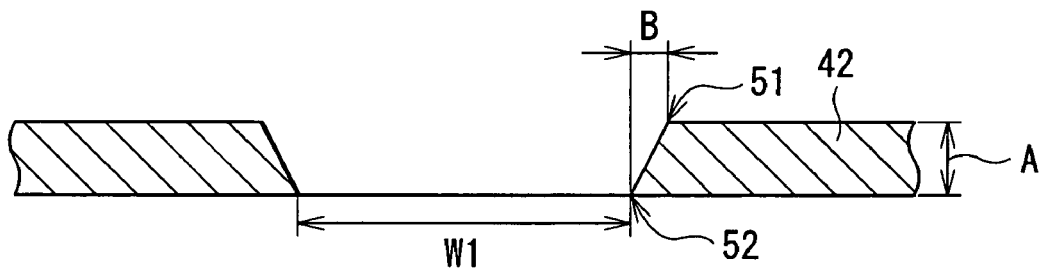
FIG. 5 is an illustration for describing a relationship between the thickness of the pixel electrode and an inclined portion of the pixel electrode.

The side surface 50 of the reflective pixel electrode 42 is inclined so as to prevent the occurrence of misalignment specific to the vertically aligned liquid crystal, which will be described later. Herein, as shown in FIG. 5, where the thickness of the reflective pixel electrode 42 is A, and a distance from a top end portion 51 to a bottom end portion 52 in the side surface 50 in a horizontal direction is B, the degree of inclination of the side surface 50 is represented by B/A. As will be described later, in consideration of a relationship between the effect of preventing the occurrence of misalignment and the reflectivity, the degree of inclination of the side surface 50 preferably satisfies the following condition.

$$1/4 \leq B/A \leq 3$$

It is not necessarily the case that the side surface 50 is inclined fully linearly, and when the side surface 50 is inclined substantially linearly, a sufficient effect can be obtained. Moreover, as a method of manufacturing the reflective pixel electrode 42, at first, like a conventional method, after, for example, a metal film of aluminum or the like is formed on the silicon substrate 41 in a semiconductor process, the metal film is processed by a photolithography technique to form an electrode in a square shape. After that, a process of applying argon ions to a pixel surface to etch the pixel is carried out to form the inclined side surface 50. A method of processing the side surface 50 is not specifically limited to the above process.

Next, functions and actions of the reflective liquid crystal display device formed as described above will be described below.

In the reflective liquid crystal display device, as shown in FIG. 1, incident light L1 entering from the facing substrate 30 and passing through the vertically aligned liquid crystal 45 is reflected by a reflection function of the reflective pixel electrode 42. The light L1 reflected by the reflective pixel electrode 42 passes through the vertically aligned liquid crystal 45 and the facing substrate 30 to an opposite direction to a direction where the light is entered so as to be emitted. At this time, the optical characteristics of the vertically aligned liquid crystal 45 are changed according to a potential difference between facing electrodes, thereby the light L1 passing through the vertically aligned liquid crystal 45 is modulated. Therefore, by the light modulation, gray levels can be produced, and modulated light L2 is used for image display.

A voltage is applied to the vertically aligned liquid crystal 45 by the pixel drive circuit 61 shown in FIG. 2. The data driver 62 provides image signals to the data line 71 according to the image signals D from outside which are inputted through the signal line 64. The scan driver 63 successively provides scanning signals to each scanning line 72 with predetermined timing. Thereby, pixels in a portion where the scanning signals from the scanning line 72 scan and the image signals from the data line 71 are applied are selectively driven.

Figure 9A:
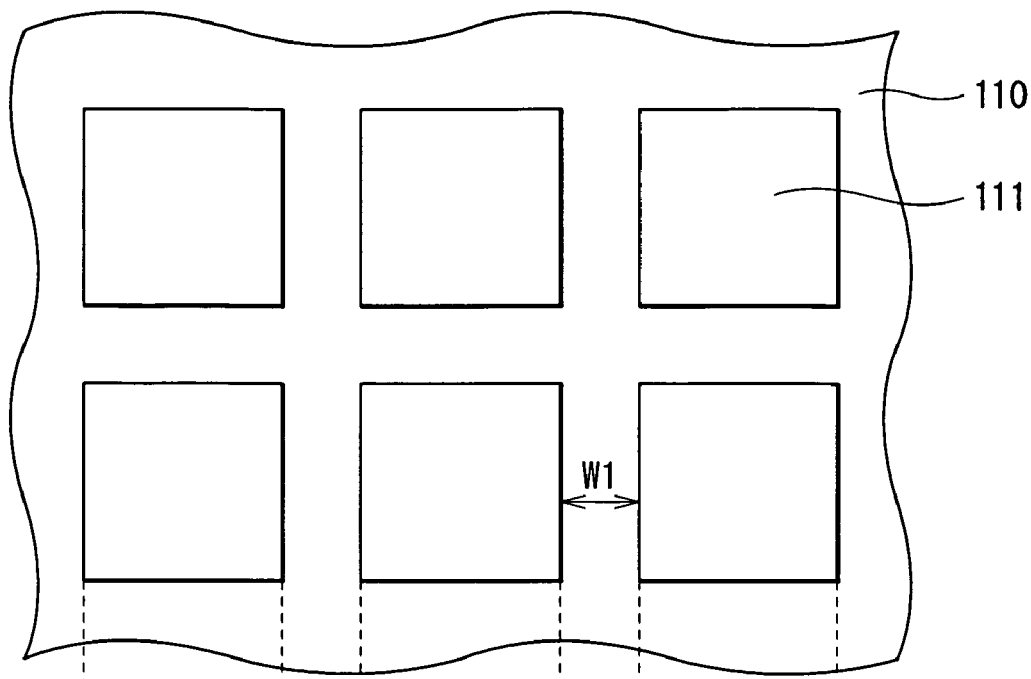
FIGS. 9A and 9B are illustrations of a conventional reflective liquid crystal display device on a pixel electrode substrate side.
Figure 9B:
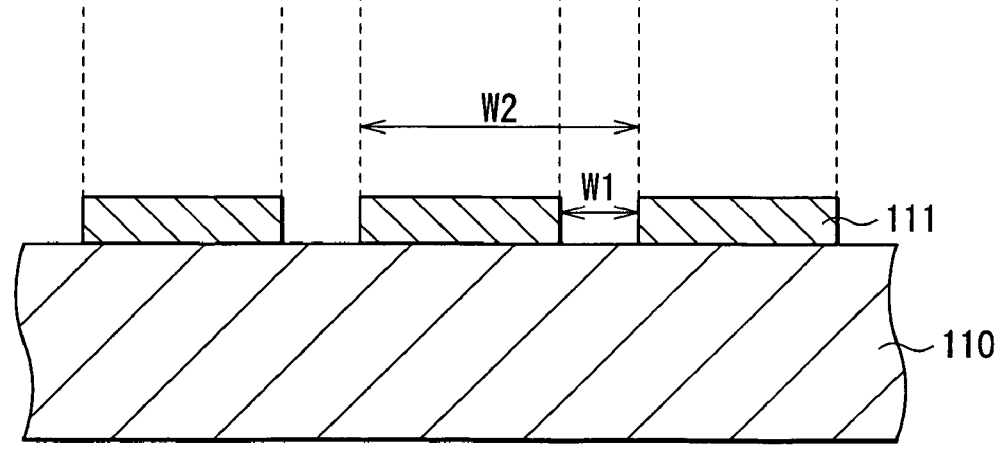
Figure 10A:
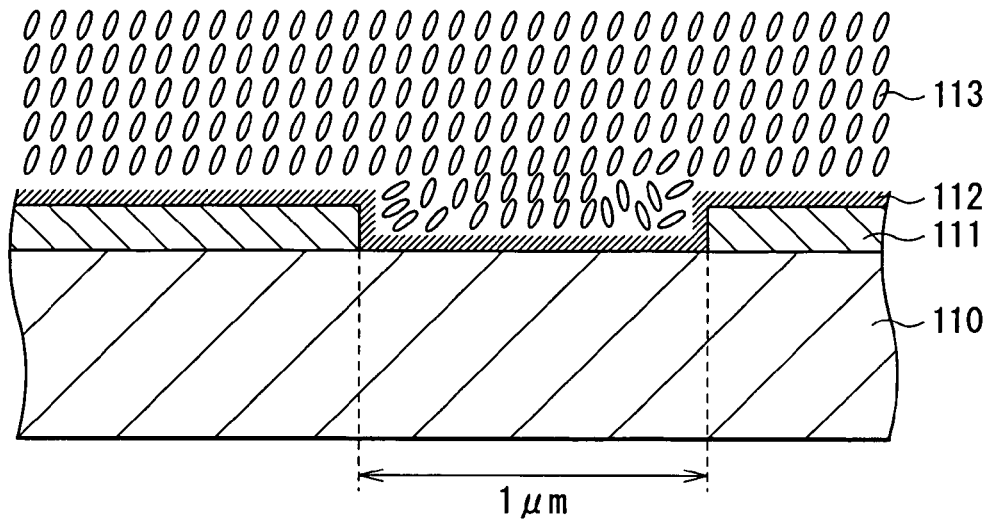
FIGS. 10A and 10B are sectional views for describing a problem due to misalignment which occurs in the conventional reflective liquid crystal display device.
Figure 10B:
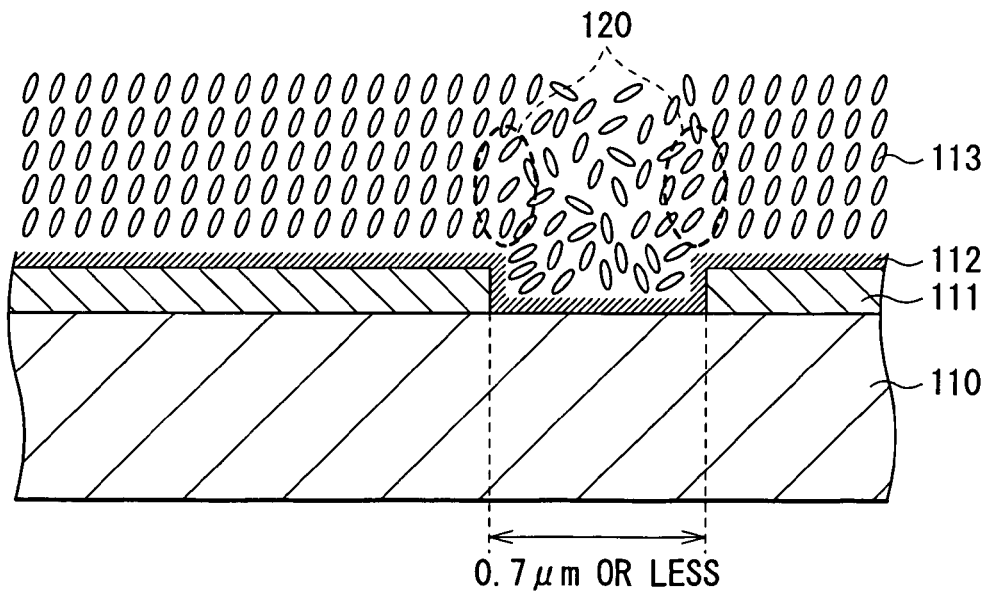

As described above, in the case where a conventional reflective pixel electrode 111 (refer to FIGS. 9A and 9B) in which the side surfaces are vertical in cross section in a thickness direction is used, as shown in FIG. 10B, specifically when the width W1 of the pixel groove is 0.7 microns or less, it is observed that a large number of liquid crystal molecules are horizontally aligned in the pixel groove. In this case, a phenomenon in which misalignment extends to an edge portion of the pixel (a region 120 in FIG. 10B) occurs, and the phenomenon specifically causes degradation in image quality.

Figure 4:
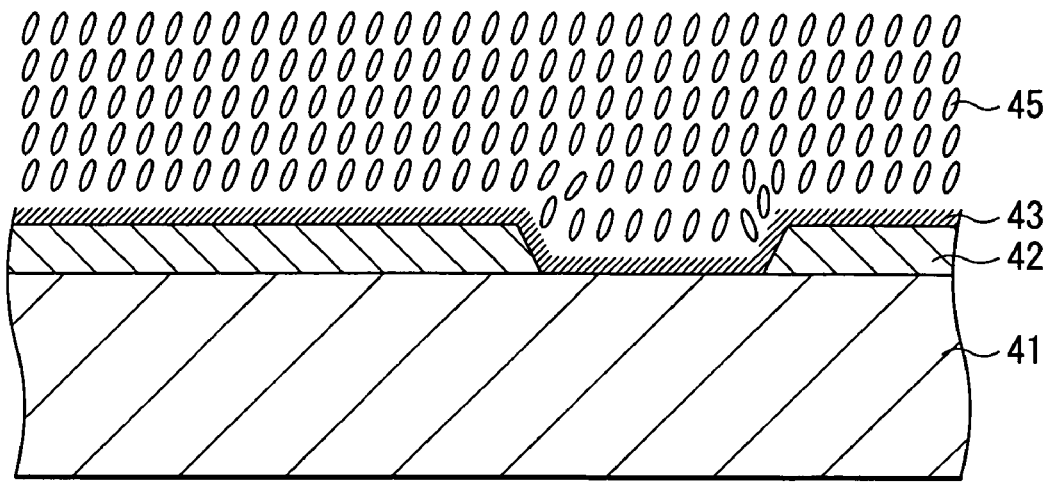
FIG. 4 is an illustration showing the alignment state of a liquid crystal in the reflective liquid crystal display device according to the embodiment of the invention.

On the other hand, in the reflective liquid crystal display device according to the embodiment, as the side surface 50 of the reflective pixel electrode 42 is inclined, as shown in FIG. 4, a misalignment problem can be easily solved. In other words, as the side surface 50 is inclined so as to eliminate the verticality in the cross section of the reflective pixel electrode 42, liquid crystal molecules horizontally aligned to an extreme in a pixel groove portion can be eliminated. Even if liquid crystal molecules are locally and slightly aligned in a horizontal direction, sufficient verticality can be maintained in the pixel groove portion by an interaction with vertically aligned liquid crystal molecules around the horizontally aligned liquid crystal molecules. As a result, as shown in examples which will be described later, it is obvious that, for example, even if the width W1 of the pixel groove is as small as 0.4 microns, a state where all liquid crystal molecules are substantially vertically aligned can be achieved. It is considered that also the same effect can be achieved in the case where the width W1 of the pixel groove is reduced to 0.3 microns. Moreover, in a conventional structure, the thinner the thickness of a liquid crystal layer is, the more misalignment occurs. However, in the structure according to the embodiment, even if the thickness of the liquid crystal layer is as small as, for example, 2.5 microns or less, misalignment can be prevented. The thickness of the liquid crystal layer is preferably 1 micron or more. When the thickness is smaller than 1 micron, it is difficult to form the liquid crystal layer with a uniform thickness.

The effect of preventing the occurrence of misalignment is achieved, when the degree B/A of inclination of the side surface 50 (refer to FIG. 5) is approximately ¼ or more. When the proportion of the inclined surface in the pixel surface increases, the loss of light reflectivity is suffered, so B/A has a practically optimum range. A decline in the reflectivity can cancel out a reduction in the width W1 of the pixel groove (an improvement in the aperture ratio); however, it is assumed that the width W1 of the pixel groove is limited to approximately 0.3 to 0.4 microns. Therefore, from results of measurements shown in examples which will be described later, B/A ranging from ¼ to 3 satisfies various characteristics.

Figure 6:
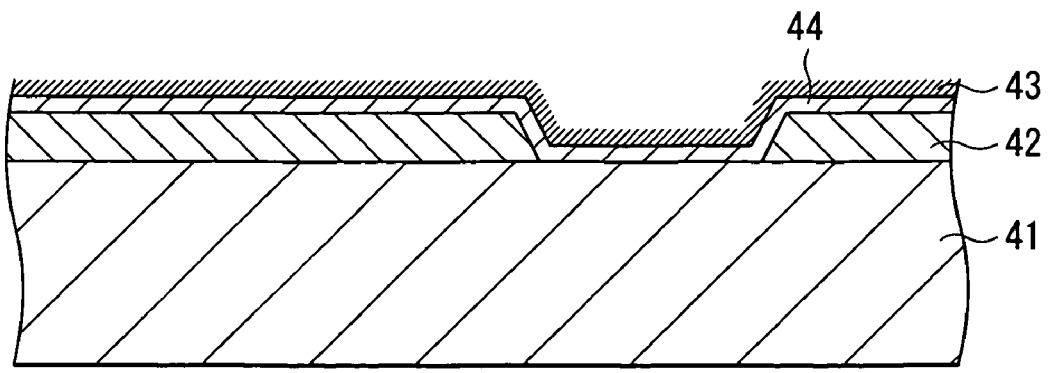
FIG. 6 is a sectional view of another example of a pixel electrode substrate.

Like the reflective liquid crystal device, in a reflective device using a silicon drive device, for the purpose of protection or the like of the reflective pixel electrode 42, as shown in FIG. 6, the surface of the reflective pixel electrode 42 is generally overcoated with a passivation film 44 made of silicon oxide (SiO) or silicon nitride (SiN). The alignment film 43 is formed on the passivation film 44. The passivation film 44 is formed through a film formation technique such as CVD (Chemical Vapor Deposition) or the like in a LSI process, so as shown in FIG. 6, the passivation film 44 is uniformly laid over the reflective pixel electrode 42 and side surfaces and the bottom surface of the pixel groove. In the structure of the reflective pixel electrode 42 according to the embodiment, in the case where another film such as the passivation film 44 is formed between the alignment film 43 and the reflective pixel electrode 42, the pixel shape as a base of the film is reflected, so the whole structure including the film has the same inclined shape. Therefore, also in the case where the reflective pixel electrode 42 is overcoated with another film such as the passivation film 44, the effect of preventing the occurrence of misalignment can be achieved in a like manner.

As described above, in the reflective liquid crystal display device according to the embodiment, the side surface of the reflective pixel electrode 42 is inclined, so even if the width of the pixel groove and the pixel pitch are reduced, or even if the thickness of the liquid crystal layer is reduced, in the state where an appropriate pretilt angle is maintained, misalignment specific to the vertically aligned liquid crystal due to the pixel groove can be eliminated or minimized, and superior characteristics regarding contrast and image quality can be achieved. In particular, the pixel pitch can be narrower than that in the conventional reflective liquid crystal display device, so the total reflectivity can be improved. Moreover, as the thickness of the liquid crystal layer can be smaller than that in the conventional reflective liquid crystal display device, the response speed of the liquid crystal can be improved.

<Description of Liquid Crystal Display Unit>

Figure 7:
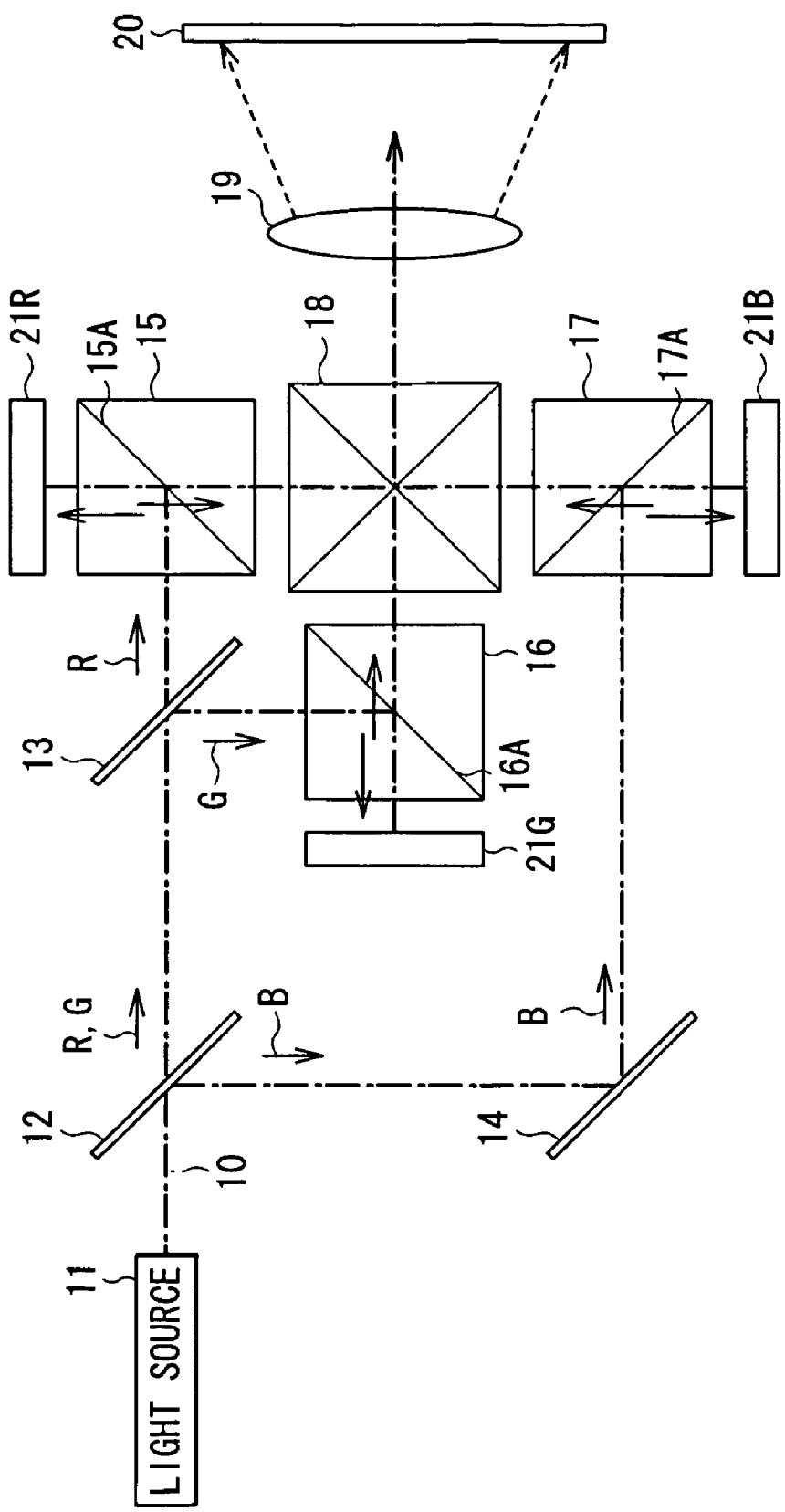
FIG. 7 is an illustration of an example of a liquid crystal display unit comprising the reflective liquid crystal display device shown in FIG. 1.

Next, an example of a liquid crystal display unit using the reflective liquid crystal display device with the structure shown in FIG. 1 will be described below. As shown in FIG. 7, a reflective liquid crystal projector using the reflective liquid crystal display device as a light valve will be described as an example.

The reflective liquid crystal projector shown in FIG. 7 is a so-called three-panel system using three liquid crystal light valves 21R, 21G and 21B for red, green and blue to display a color image. The reflective liquid crystal projector comprises a light source 11, dichroic mirrors 12 and 13 and a total reflection mirror 14 along an optical axis 10. The reflective liquid crystal projector further comprises polarizing beam splitters 15, 16 and 17, a synthesizing prism 18, a projection lens 19 and a screen 20.

The light source 11 emits white light including red light (R), blue light (B) and green light (G) which are required to display a color image, and as light source 11, for example, a halogen lamp, a metal halide lamp, a xenon lamp or the like is used.

The dichroic mirror 12 has a function of separating light from the light source 11 into blue light and light of other colors. The dichroic mirror 13 has a function of separating light passing through the dichroic mirror 12 into red light and green light. The total reflection mirror 14 reflects the blue light separated by the dichroic mirror 12 toward the polarizing beam splitter 17.

The polarizing beam splitters 15, 16 and 17 are disposed along the optical paths of red light, green light and blue light, respectively. The polarizing beam splitter 15, 16 and 17 have polarization splitting surfaces 15A, 16A and 17A, respectively, and have a function of dividing each incident color light into two polarized components orthogonal to each other on the polarization splitting surfaces 15A, 16A and 17A. The polarization splitting surfaces 15A, 16A and 17A reflect one polarized component (for example, S-polarized component) and pass the other polarized component (for example, P-polarized component) therethrough.

As the liquid crystal light valves 21R, 21G and 21B, reflective liquid crystal display devices with the above-described structure (refer to FIG. 1) are used. A predetermined polarized component (for example, S-polarized component) of each color light divided by each of the polarization splitting surfaces 15A, 16A and 17A of the polarizing beam splitters 15, 16 and 17 enters into each of the liquid crystal light valves 21R, 21G and 21B. When the liquid crystal light valves 21R, 21G and 21B are driven by a drive voltage given according to image signals, the liquid crystal light valves 21R, 21G and 21B have a function of modulating incident light and reflecting the modulated light toward the polarizing beam splitters 15, 16 and 17, respectively.

The synthesizing prism 18 has a function of synthesizing the predetermined polarized component (for example, P-polarized component) of each color light which is emitted from each of liquid crystal light valves 21R, 21G and 21B and passes through each of the polarizing beam splitters 15, 16 and 17. The projection lens 19 has a function as a projection means of projecting synthesized light emitted from the synthesizing prism 18 toward the screen 20.

In the reflective liquid crystal projector with the above structure, white light emitted from the light source 11 is separated into blue light and light of other colors (red light and green light) by the function of the dichroic mirror 12. The blue light is reflected toward the polarizing beam splitter 17 by the function of the total reflection mirror 14. The light of other colors is separated into red light and green light by the function of the dichroic mirror 13. The red light and the green light enter into the polarizing beam splitters 15 and 16, respectively.

The polarizing beam splitters 15, 16 and 17 divide each incident color light into two polarized components orthogonal to each other on the polarization splitting surfaces 15A, 16A and 17A, respectively. At this time, the polarization splitting surfaces 15A, 16A and 17A reflect one polarized component (for example, S-polarized component) toward the liquid crystal light valves 21R, 21G and 21B, respectively.

The liquid crystal light valves 21R, 21G and 21B are driven by a drive voltage given according to image signals, and modulate the predetermined polarized component of each color light entered into the liquid crystal light valves 21R, 21G and 21B on a pixel-by-pixel basis. At this time, as the liquid crystal light valves 21R, 21G and 21B, the reflective liquid crystal display devices shown in FIG. 1 are used, so superior characteristics regarding contrast and image quality can be achieved.

The liquid crystal light valves 21R, 21G and 21B reflect each modulated color light toward the polarizing beam splitters 15, 16 and 17, respectively. The polarizing beam splitters 15, 16 and 17 pass only a predetermined polarized component (for example, P-polarized component) among reflected (modulated) light from the liquid crystal light valves 21R, 21G and 21B, respectively, to emit the predetermined polarized component toward the synthesizing prism 18. The synthesizing prism 18 synthesizes the predetermined components of each color light having passed through the polarizing beam splitters 15, 16 and 17 to emit the synthesized light to the projection lens 19. The projection lens 19 projects the synthesized light emitted from the synthesizing prism 18 toward the screen 20. Thereby, an image according to the light modulated by the liquid crystal light valves 21R, 21G and 21B is projected on the screen 20 so as to display a desired image.

As described above, in the reflective liquid crystal projector according to the embodiment, the reflective liquid crystal display devices (refer to FIG. 1) including the reflective pixel electrode 42 with the inclined side surface 50 (refer to FIGS. 3A and 3B) are used as the liquid crystal light valves 21R, 21G and 21B, so an image with high contrast and superior image quality can be displayed.

Next, specific characteristics of the reflective liquid crystal display device according to the embodiment will be described referring to examples. Before describing the examples, as a comparative example, the characteristics of the conventional reflective liquid crystal display device will be described below.

COMPARATIVE EXAMPLE

As a comparative example, test samples of the reflective liquid crystal display device were formed as below. At first, after a glass substrate on which a transparent electrode was formed and a silicon drive substrate on which an aluminum electrode was formed as a reflective pixel electrode were cleaned, they were introduced into an evaporation apparatus to form a $SiO_2$ film as an alignment film through oblique evaporation at an evaporation angle ranging from 45° to 55°. The thickness of the alignment film was 50 nm. The alignment was controlled so that the pretilt angle of the liquid crystal was approximately 2.5°. After that, the substrates on which the alignment film was formed faced each other, and an adequate number of glass beads with a diameter of 2 μm were distributed therebetween to bond the substrates together. Further, a vertical liquid crystal material manufactured by Merck in which dielectric anisotropy $\Delta \in$ was negative and the refractive index anisotropy $\Delta n$ was 0.1 was injected between the substrates so as to form each of the test samples of the reflective liquid crystal display device. The reflective liquid crystal display devices in which the pixel pitch W2 of the aluminum electrode on the silicon drive substrate was 9 microns, and the width W1 between pixels was changed to 0.4 microns, 0.5 microns, 0.6 microns, 0.7 microns and 0.8 microns were formed (as test samples Nos. 1 through 5 in FIG. 8). Moreover, the reflective liquid crystal display devices in which the aluminum electrode was overcoated with a passivation film of $SiO_2$ with a thickness of 45 nm for protecting a display pixel area were formed through the same method (as test samples Nos. 6 through 10 in FIG. 8). The electrode structure in the reflective liquid crystal display devices in the comparative example was the same as that shown in FIGS. 9A and 9B, and the side surfaces of the aluminum electrode were vertical in cross section.

After forming the reflective liquid crystal display devices, results of observing the alignment state of the liquid crystal in a black level with a microscope are shown in FIG. 8 together with the results of Examples 1 and 2 which will be described later. In the reflective liquid crystal display devices in which no passivation film was included, and the width W1 of the pixel groove was 0.7 microns or less (that is, test samples Nos. 2 through 5) and all of the reflective liquid crystal display devices including the passivation film (that is, test samples Nos. 6 through 10), an nonuniform alignment area in which the black level was higher than that in a pixel portion, and which had unevenness in alignment obviously different from that in its surroundings existed in an area around the edge of the reflective pixel electrode and in the vicinity of the pixel groove. When the alignment of the liquid crystal molecules in the area was observed with a polarizing microscope while rotating a polarizing axis, it was found out that in an effective pixel, the liquid crystal molecules were perfectly vertically aligned, but the liquid crystal around the pixel and in the pixel groove included a large amount of a component other than a desired vertical component (that is, a randomly aligned component mainly including a component inclined in a horizontal direction to some extent along the groove direction). Moreover, when a voltage is applied to each test sample to drive the liquid crystal, in the top surface of the pixel, the reflectivity was increased according to the magnitude of the voltage as normal, thereby the top surface of the pixel reached a white level, but on the other hand, when a considerable amount of voltage was applied, an area around the pixel groove reached the white level; however, with a gray-scale voltage, the reaction was obviously slow, so when an image with gray levels was displayed, in an area around the pixel, unevenness in brightness which was different from that in the pixel was observed.

EXAMPLE 1

Basically, test samples of the reflective liquid crystal display device were formed according to the same method and the same specifications as those in the above comparative example. More specifically, after a glass substrate on which a transparent electrode was formed and a silicon drive substrate on which an aluminum electrode was formed as a reflective pixel electrode were cleaned, they were introduced into an evaporation apparatus to form a $SiO_2$ film as an alignment film, and after that, a vertical liquid crystal material manufactured by Merck in which dielectric anisotropy $\Delta\in$ was negative and the refractive index anisotropy $\Delta n$ was 0.1 was injected between the substrates so as to form each of the test samples of the reflective liquid crystal display device. The reflective liquid crystal display devices in which the specifications of the silicon drive substrate were the same as those in the comparative example, and the pixel pitch W2 was 9 microns, and the width W1 between pixels (the width W1 of the pixel groove) was changed to 0.4 microns, 0.5 microns, 0.6 microns, 0.7 microns and 0.8 microns were formed (as test samples Nos. 11 through 15 in FIG. 8). The reflective liquid crystal display devices in which a passivation film was formed on the aluminum electrode were formed in a like manner (as test samples Nos. 16 through 20 in FIG. 8).

However, in the example, unlike the above comparative example, when the pixel electrode was formed, the following steps were introduced so as to form the structure of the pixel electrode shown in FIGS. 3A and 3B. More specifically, as a step of forming the pixel electrode, a process in which after a square pixel electrode was formed on the silicon drive substrate through photolithography, the silicon drive substrate was introduced in a discharge atmosphere of an argon gas to expose the surface of the pixel electrode to argon ions for 30 seconds was introduced. It was found out that when the process was carried out, edge portions of four sides of the pixel where an electric field was concentrated were etched more than the surface of the pixel electrode, so as a result, the edge portions were etched away. Therefore, as a result, the structure in which the edge portions (that is, a peripheral portion) were obliquely cut away by 37.5 nm (corresponding to B=37.5 nm in FIG. 5) from the aluminum pixel electrode with a thickness of 150 nm (corresponding to A=150 nm in FIG. 5) was formed. It corresponded to B/A=¼. Also, in the case where the passivation film was included, by reflecting the shape of the pixel electrode as a base, the whole structure of the pixel electrode including the passivation film with substantially the same trapezoidal shape could be obtained. The alignment state of the liquid crystal of each test sample with the pixel structure was observed in the black level through the same method as that in the comparative example.

The observation results are shown in FIG. 8. In the example, nonuniformity due to misalignment around the pixel groove which was observed in the comparative example was not observed in all of the test samples. Moreover, even if an image with gray levels was displayed during the application of a voltage, no unevenness was observed. In the test samples in the example, the reflectivity was much the same as that in the test samples in the comparative example. In other words, it was found out that such a degree of change in the structure did not affect the reflectivity.

In the case where a test sample in which a polyimide film instead of the silicon oxide film ($SiO_2$ film) was used as the alignment film, and the alignment was controlled through rubbing the polyimide film was observed, the observation result was the same.

EXAMPLE 2

Test samples (test samples Nos. 21 through 25 in FIG. 8) of the reflective liquid crystal display device were formed through the same method as in Example 1. However, as a step of forming the pixel electrode, a process in which the surface of the pixel electrode was exposed to argon ions for a longer time than in Example 1 (100 seconds) was introduced. As a result, the structure in which a peripheral portion was substantially obliquely cut away by approximately 200 nm (corresponding to B=200 nm in FIG. 5) from the aluminum pixel electrode with a thickness of 150 nm (corresponding to A=150 nm in FIG. 5) was formed. It corresponded to B/A=1.33. The alignment state of the liquid crystal of each test sample with the pixel structure in the black level was observed by using through the same method as that in the comparative Example and Example 1.

The observation results are shown in FIG. 8. In the example, nonuniformity due to misalignment around the pixel groove which was observed in the comparative example was not observed in all of the test samples. Moreover, even if an image with gray levels was displayed during the application of a voltage, no unevenness was observed.

On the other hand, when the reflectivity was measured, compared to the case where a process of obliquely cutting an area around the pixel away was not carried out, a 1% to 2% reduction in the reflectivity was observed; however, in this case, the width W1 of the pixel groove was further reduced, for example, by 0.1 microns from 0.6 microns to 0.5 microns, a loss of the reflectivity could be cancelled out.

Moreover, by further extending the time of applying argon ions, the inclination of the side surface of the pixel electrode can be gentler (that is, the width B of an inclined portion can be larger); however, when B/A is larger than 3, a decline in the reflectivity is larger than 5%, so unless the width W1 of the pixel groove is smaller than 0.3 microns, the loss of the reflectivity cannot be cancelled out. Therefore, it is not practically preferable. As the results of the examples, it is preferable to satisfy the following condition.

$$\tfrac{1}{4} \leq B/A \leq 3$$

In addition, in the case where the width W1 of the pixel groove is 0.35, the same effects can be obtained, although it is not shown as an example. In consideration of an improvement in manufacturing techniques, even if the width W1 of the pixel groove is reduced to approximately 0.3 microns, it can be easily considered that the same effect can be obtained.

The invention is not limited to the above embodiment, and is variously modified. For example, in the above embodiment, the three-panel system projector is described as an example of the projector. However, the invention can be widely applied to any other system projectors such as a single panel system. Moreover, the shape of the reflective pixel electrode 42 in a plan view is not limited to a rectangular shape, and may be any other shape such as a polygonal shape.

As described above, in the reflective liquid crystal display device according to the invention, the side surface of the pixel electrode is inclined, so even if the width of the pixel groove is small, or the liquid crystal layer is thin, a state where all liquid crystal molecules can be substantially vertically aligned can be achieved. Thereby, the occurrence of misalignment specific to the vertically aligned liquid crystal due to the structure of the pixel groove can be eliminated or minimized so as to obtain higher contrast and superior image quality.

Moreover, the liquid crystal display unit according to the invention uses the reflective liquid crystal display device to display an image, so an image with high contrast and superior image quality can be displayed.

The invention claimed is:

1. A reflective liquid crystal display device, comprising:
   a pixel electrode substrate including a plurality of reflective pixel electrodes;
   a facing substrate including a transparent electrode, the transparent electrode facing the reflective pixel electrodes; and
   a vertically aligned liquid crystal injected between the pixel electrode substrate and the facing substrate, wherein,
      at least one side surface of each of the reflective pixel electrodes is inclined, and
      a width between adjacent reflective pixel electrodes is within a range from 0.3 microns to 0.7 microns inclusive.

2. A reflective liquid crystal display device according to claim 1, wherein
   a side surface of each of the reflective pixel electrodes is inclined in a cross section of the reflective pixel electrode in a thickness direction so that the width of the reflective pixel electrode increases from the top side to the bottom side, and
   the reflective pixel electrode has a trapezoidal shape in the cross section.

3. A reflective liquid crystal display device according to claim 1, wherein
   where the thickness of each of the reflective pixel electrodes is A, and a distance from a top end portion to a bottom end portion in the inclined side surface in a horizontal direction is B, the following condition is satisfied;

$$\tfrac{1}{4} \leq B/A \leq 3.$$

4. A reflective liquid crystal display device according to claim 1, wherein
   at least one film is laminated on a surface of each of the reflective pixel electrodes on a side closer to the vertically aligned liquid crystal, and
   the laminated film is inclined along the inclined side surface of the reflective pixel electrode so that the shape of the reflective pixel electrode is reflected.

5. A reflective liquid crystal display device according to claim 4, wherein
   as the film on the surface of each of the reflective pixel electrodes on a side closer to the vertically aligned liquid crystal, an alignment film is laminated.

6. A reflective liquid crystal display device according to claim 5, wherein
   a passivation film is further laminated between each of the reflective pixel electrodes and the alignment film.

7. A reflective liquid crystal display device according to claim 4, wherein
   as the film on the surface of each of the reflective pixel electrodes on a side closer to the vertically aligned liquid crystal, an alignment film formed through obliquely evaporating an inorganic material is laminated.

8. A reflective liquid crystal display device according to claim 1, wherein
   the thickness of a liquid crystal layer into which the vertically aligned liquid crystal is injected is within a range from 1.0 micron to 2.5 microns inclusive.

9. A liquid crystal display unit comprising a reflective liquid crystal display device, the reflective liquid crystal display device comprising:
   a pixel electrode substrate including a plurality of reflective pixel electrodes;
   a facing substrate including a transparent electrode, the transparent electrode facing the reflective pixel electrodes; and
   a vertically aligned liquid crystal injected between the pixel electrode substrate and the facing substrate, and
   at least one side surface of each of the reflective pixel electrodes is inclined, wherein
      a width between adjacent reflective pixel electrodes is within a range from 0.3 microns to 0.7 microns inclusive, and
   the liquid crystal unit displays an image by using light modulated by the reflective liquid crystal display device.

10. A liquid crystal display unit according to claim 9, further comprising:
    a light source; and
    a projection means of projecting light emitted from the light source and modulated by the reflective liquid crystal display device to a screen,
    wherein the liquid crystal display unit is used as a reflective liquid crystal projector.

* * * * *